May 19, 1953 J. M. BARR 2,638,739
FUEL SUPPLY CONTROL SYSTEM FOR INTERMITTENT JET ENGINES
Filed Nov. 20, 1947 3 Sheets-Sheet 3

INVENTOR
John M. Barr
BY
ATTORNEY

Patented May 19, 1953

2,638,739

UNITED STATES PATENT OFFICE 2,638,739

FUEL SUPPLY CONTROL SYSTEM FOR INTERMITTENT JET ENGINES

John M. Barr, Rochester, N. Y., assignor to Niles-Bement-Pond Company, West Hartford, Conn., a corporation of New Jersey Application November 20, 1947, Serial No. 787,198

12 Claims. (Cl. 60—39.14)

The present invention relates to a fuel supply control system for internal combustion engines. It is shown as applied to an engine of the resonant jet type, although it is applicable to other types of engines.

Engines of the resonant or intermittent jet type commonly include a combustion chamber and an exhaust jet directly opening from the combustion chamber so that the products of combustion may pass through it to the atmosphere. When used on a vehicle, e. g., an aircraft, the jet is directed to the rear to provide a forward thrust. Fuel is supplied to the combustion chamber under pressure. Air flows to the combustion chamber through a valve mechanism which prevents a return flow of air from the combustion chamber toward the air inlet. Suitable ignition mechanism is provided, usually a continuously operating spark plug.

In such an engine, as in the case of other internal combustion engines, it is desirable to maintain the fuel flow in predetermined relationship with the rate of flow of combustion air to the engine. The air flow may be measured by a conventional type of Pitot tube or other flow measuring device which may be placed in the air entrance conduit. If the engine is used on an aircraft, as is the usual engine of this type, the speed of the aircraft through the air may be used as a measure of the rate of combustion air flow through the engine. In that case, the Pitot tube may be placed anywhere on the aircraft so as to be exposed to the air stream.

Since aircraft operate at varying altitudes and hence varying air pressures, the air pressure differential set by the Pitot tube is not a true measure of the mass of air flowing through the engine, and this measurement must therefore be compensated for variations in air density if the fuel flow is to be maintained in predetermined relationship with the air flow.

It is therefore an object of the present invention to provide an improved fuel flow control system for an internal combustion engine in which the rate of flow of fuel is regulated in accordance to the rate of flow of air through the engine and in accordance with the barometric pressure.

Another object is to provide an improved starting control mechanism for a fuel supply system of the type described.

A further object is to provide an improved mechanism for limiting the flow of fuel through such an engine.

Figure 1:
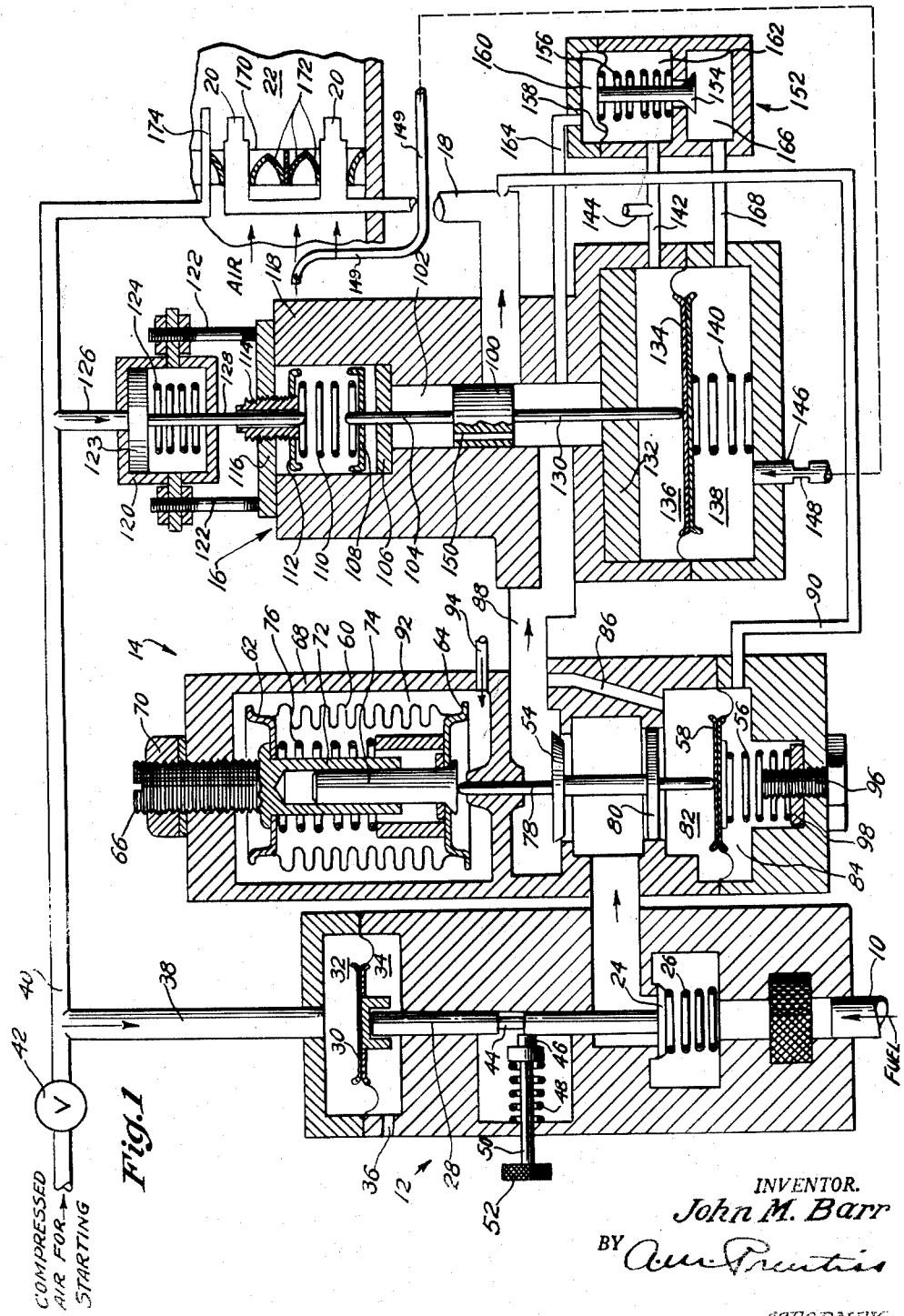

Other objects and advantages will become apparent from a consideration of the appended specifications, claims and drawings, in which Figure 1 represents, somewhat diagrammatically, a fuel flow control system embodying my invention.

Figure 2:
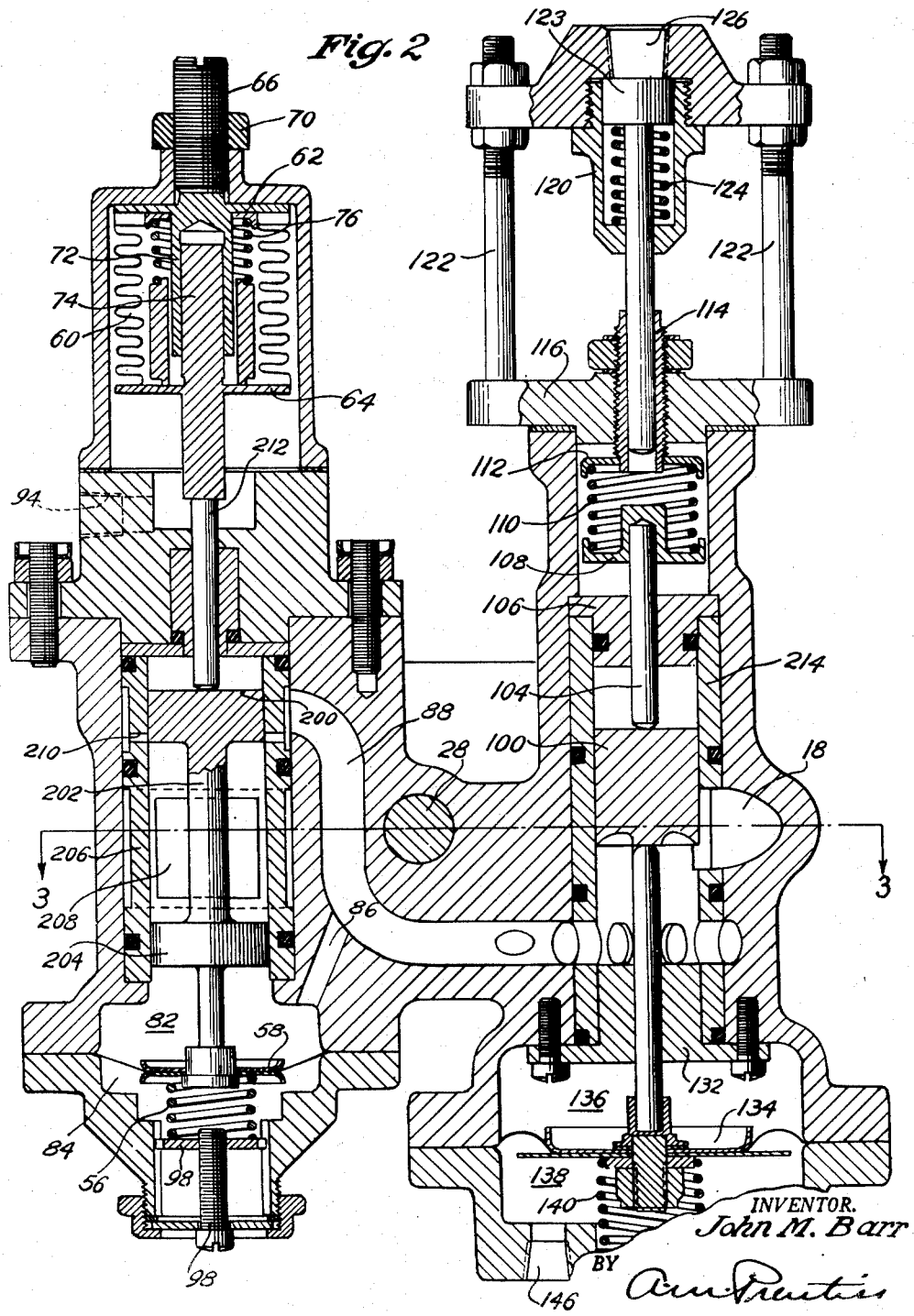
Figure 3:
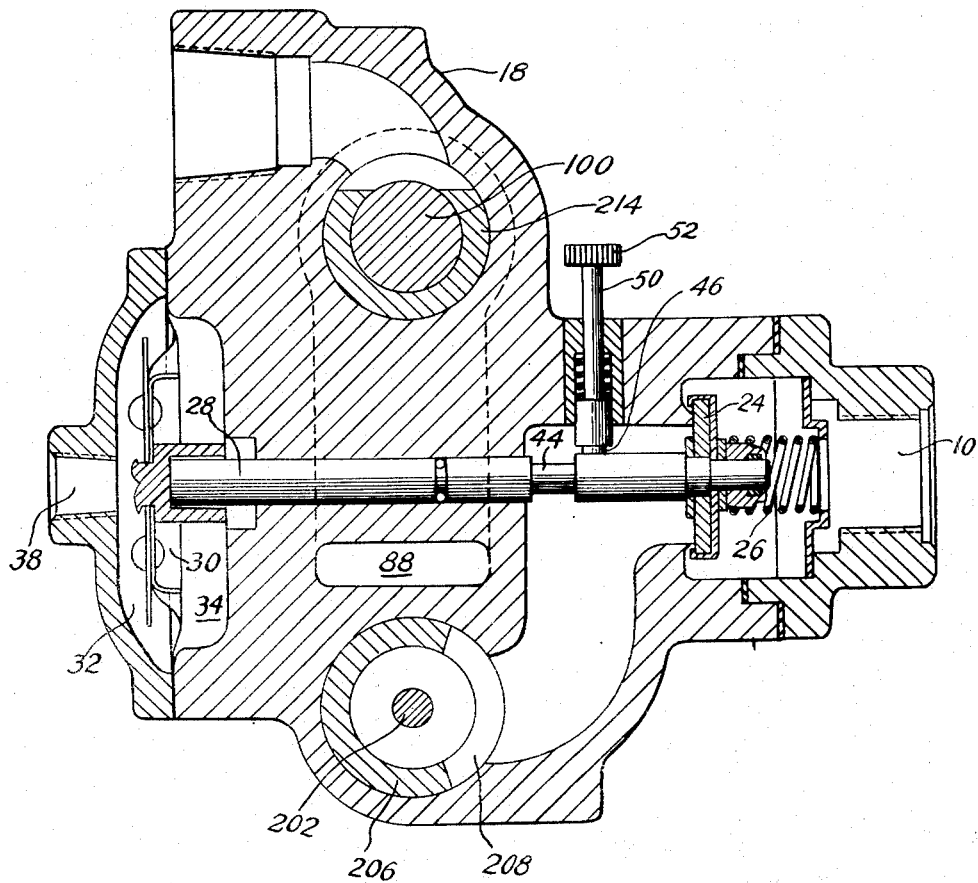

Figure 2 shows a cross sectional view of a fuel flow control mechanism built in accordance with the diagram of Figure 1, and Figure 3 is a cross sectional view taken on the line 3—3 of Figure 2.

Referring to Figure 1, the fuel comes from a tank or pump or other source of fuel under pressure (not shown) and flows through a conduit 10, an inlet valve mechanism generally indicated at 12, a pressure regulating valve mechanism 14, a variable metering orifice 16, and thence through a conduit 18 and nozzles 20 to the combustion chamber 22.

The inlet valve mechanism 12 comprises a poppet valve 24 biased closed by a spring 26. A valve stem 28 extends upwardly from valve 24 and is engaged at its upper end by a diaphragm assembly 30 which separates a pair of expansible chambers 32 and 34. The chamber 34 is vented to atmosphere as indicated at 36. The chamber 32 is connected through a conduit 38 to a conduit 40 controlled by a valve 42, through which compressed air is supplied for starting purposes.

The valve stem 28 is recessed at 44 to receive a latch 46, which is biased into the recess engaging position by a spring 48. The latch 46 is provided with a stem 50 extending through the outside of the casing of the inlet valve mechanism and provided with a knob 52.

When the engine is to be started, compressed air is supplied by opening valve 42. This increases the pressure in chamber 32 sufficiently to move stem 28 downward and open valve 24. The latch 46 then engages notch 44 and holds the valve open. Valve 24 may be closed to cut off the supply of fuel to the engine by pulling out on the knob 52.

The fuel regulating mechanism 14 regulates the fuel pressure differential across the metering orifice 16 in accordance with the atmospheric pressure. The fuel regulating mechanism 14 includes a valve 54, a spring 56 biasing the valve open, a diaphragm 58 subject to the fuel pressure differential across the metering orifice 16 and acting in opposition to the spring 56, and an expansible bellows 60 which has its exterior subjected to atmosphere pressure.

The bellows 60 is sealed to opposed end plates 62 and 64. The end plate 62 is mounted on a screw 66 which extends outwardly through a casing 68 which encloses the bellows 60. A lock nut 70 is provided for setting the position of screw 66 with reference to the casing 68.

The screw 66 extends through the end plate 62 and is provided inside the bellows 60 with a hollow sleeve 72, which is adapted to engage a rod 74 carried by the end plate 64. The rod 74 and sleeve 72 guide the bellows in its expansion and contraction so as to maintain the two end plates parallel. An internal spring 76 biases the two end plates apart. The lower end of rod 74 bears on the upper end of the stem 78 of valve 54. Below the valve 54 the stem 78 carries a thin piston 80, which serves to balance the valve against the fuel inlet pressure and also serves to guide the valve, since it operates in a cylindrical portion of the casing. The stem 78 extends down through the piston 80 and its lower end engages the upper surface of diaphragm 58.

Diaphragm 58 separates a pair of expansible chambers 82 and 84. Chamber 82 is connected through a passage 86 to the fuel conduit 88 on the upstream side of the metering orifice 16. Chamber 84 is connected through a conduit 90 to the fuel conduit 18 on the downstream side of the metering orifice.

The chamber 92 in which the bellows 60 is mounted is vented to the atmosphere, as indicated at 94. The bellows 60 is preferably filled with nitrogen or some other fluid having a suitable coefficient of thermal expansion, so that it expands and contracts both with changes in atmospheric pressure and with changes in atmospheric temperature, both of which conditions affect the density of the atmosphere.

If the density of the air increases, bellows 60 contracts, thereby allowing spring 56 to move valve 54 in an opening direction, and providing a greater mass of fuel to be mixed with the greater mass of air available at the combustion chamber. If the fuel pressure differential exceeds the value determined by the force of spring 56 and the force of bellows 60 acting on stem 78, then the valve 54 is moved downwardly, in a closing direction, until the fuel pressure differential again is restored to its desired value.

The force of spring 56 may be adjusted by means of a screw 96 which determines the position of a spring retainer 98 on which the lower end of spring 56 rests.

The variable metering orifice 16 includes a piston 100 slidable in a cylinder 102, which connects fuel conduit 88 with fuel conduit 18. The piston covers more or less of a port leading to conduit 18 and thereby forms a variable orifice. The upper end of piston 100 is attached to a rod 104 which extends upwardly through fixed plate 106 and carries a spring retainer 108. A spring 110 has its lower end resting on retainer 108 and its upper end engages a retainer 112 carried by a screw 114 which extends upwardly through a plate 116 mounted on the top of the orifice casing 118.

A cylinder 120 is mounted on studs 122 projecting upwardly from casing 118. A piston 123 inside the cylinder 120 is biased upwardly by a spring 124. The space inside cylinder 120 above piston 123 is connected through a conduit 126 to the compressed air conduit 40. Piston 123 is attached to a rod 128 which extends downwardly through the screw 114 so that its lower end is spaced from the upper end of piston rod 104.

The lower end of piston 100 is attached to a stem 130 which extends downwardly through a seal plate 132 and engages the upper surface of a diaphragm 134 which separates a pair of expansible chambers 136 and 138.

A spring 140 urges the diaphragm 134 upwardly into engagement with stem 130. Chamber 136 is connected through a conduit 142 to a static atmospheric pressure connection 144. Chamber 138 is connected through a conduit 146 having a fixed restriction 148 therein to the dynamic pressure connection of the Pitot tube 149 or other flow measuring device. The diaphragm 134 therefore has acting upwardly on it a force which is a measure of the rate of combustion air flow through the engine. This force in conjunction with the springs 110 and 140, determines the position of piston 100 and hence the area of the variable metering orifice.

A passage 150 is provided through the piston 100 in order to equalize the pressure acting on its opposite ends.

When the engine is started, the compressed air valve 42 is open and the pressure is supplied through conduit 126 to cylinder 120 where it moves piston 123 downwardly against spring 124, thereby moving rod 128 downwardly until it is stopped by spring 124. Rod 128 is then effective to limit the upward travel of piston 100, and hence to limit the maximum opening of the variable orifice.

A fuel limiting control is generally shown at 152. The fuel limit control 152 includes a valve 154 biased closed by a spring 156 and movable to open position by a diaphragm 158, which acts in opposition to the spring. Diaphragm 158 separates an expansible chamber 160 from an expansible chamber 162. Chamber 160 is connected through a conduit 164 to the cylinder 102 at the upstream side of the variable metering orifice, so that chamber 160 is subject to the fuel pressure at that point. Chamber 162 is vented through conduit 142 and vent 144. Valve 154 controls the communication between chamber 162 and a chamber 166 connected through a conduit 168 to the chamber 138 under diaphragm 134. Valve 154 is normally closed, but when the fuel pressure on the upstream side of the variable metering orifice exceeds a value determined by the strength of spring 156, then valve 154 is open, thereby reducing the pressure in chamber 138 and allowing the piston 100 to move downwardly to restrict the flow through the variable metering orifice. The spring 156 and diaphragm 158 may be so designed as to maintain the maximum fuel flow at any desired value.

Associated with the combustion chamber 22, there are shown, somewhat diagrammatically, a grill 170 which supports the nozzles 20, and a series of flapper valves 172. These valves are shown in their closed positions. When the pressure in the combustion chamber falls below the intake air pressure, the valves 172, being flexible, are opened by that difference of pressures, admitting fresh air to the combustion chamber.

Compressed air conduit 40 leads to a nozzle 174 in the combustion chamber by which air under pressure may be supplied for starting purposes.

Figures 2 and 3 show in detail the construction of a fuel flow control device embodying the principle of the system shown diagrammatically in Figure 1. In Figures 2 and 3 the various elements have been given the same reference characters as their counterparts in Figure 1. Most of the elements need not be further described.

The function of valve 54 of Figure 1 is performed by a piston 200, which is formed on one end of a rod 202 having a second piston 204 formed on its opposite end. The piston 204 corresponds to the piston 80 of Figure 1. The pistons 200 and 204 slide in a sleeve 206, which is provided with suitable inlet ports 208 and outlet ports 210, the latter being controlled by the lower edge of piston 200. A rod 212 performs the force transmitting function of stem 78 of Figure 1.

Piston 100 moves inside a sleeve 214.

*Operation*

The operation of the fuel supply control system is as follows.

Starting with the engine at rest, fuel inlet valve 24 is closed by spring 26, manual operated air valve 42 is closed, fuel pressure regulating valve 54 is in some intermediate position determined by the outside atmospheric pressure acting on bellows 60 and spring 56, the metering orifice cooperating with fuel metering valve 100 is partially opened by said valve which is held in starting position by the balance between springs 110 and 140 (the air pressures in chambers 136 and 138 being the same), and air admission valves 172 are closed.

To start the operation of the engine, valve 42 is opened manually and the electric ignition (not shown) in combustion chamber 22 is connected for operation. The opening of valve 42 admits compressed air to combustion chamber 22 and also to chamber 32 in inlet valve mechanism 12, and chamber 120 in metering device 16. The increased pressure in chamber 32 is sufficient to depress rod 28 until latch 46 engages in notch 44, thus opening fuel valve 24 and locking it in open position. Simultaneously, the increased air pressure in chamber 120 depresses piston 123 and rod 128 which compresses spring 110 and limits the upward travel of valve 100. Fuel under pressure flows past valves 24, 54 and 100, and through nozzles 20 into combustion chamber 22 where it is mixed with compressed air entering through nozzle 174, forming an explosive mixture which is ignited by the electric ignition in chamber 22. The resulting increase in pressure in combustion chamber 22 opens a spring pressed outlet valve (not shown) at the outlet end of chamber 22 and the combustion gases are discharged through a tail pipe (not shown) to the rear of the aircraft in the form of a powerful jet which thrusts the aircraft in the opposite direction.

This process continues until the aircraft is accelerated to flying speed, at which point the impact of air in air inlet to chamber 22 opens valves 172 and admits atmospheric air under impact pressure into chamber 22, whereupon the supply of compressed air is no longer needed to sustain combustion in chamber 22 and is therefore cut off by manually closing valve 42. In the meantime, the forward speed of the aircraft causes an increase of air pressure in chamber 138, above the static atmospheric pressure in chamber 136, by the action of the pitot tube 149 connected to conduit 146. This progressively opens valve 100 in proportion to the rate of air flow through valves 172 into chamber 22, and increases the rate of fuel flow in direct ratio with rate of air flow, so as to maintain the desired fuel/air mixture.

The precise metering of the fuel to maintain the desired mixture ratio is effected by varying the fuel pressure in conduit 88 by valve 54, which is responsive to the fuel pressure differential across valve 100 by the action of diaphragm 58 and spring 56; and at the same time, varying the area of opening of valve 100, in accordance with the air pressure differential between chambers 138 and 136 acting on diaphragm 134. Since the fuel pressure differential across valve 100 is a measure of the rate of fuel flow and the air pressure differential between chambers 138 and 136 is a measure of the rate of air flow, the combined actions of diaphragms 58 and 134 on valves 54 and 100, respectively, maintain the desired fuel ratio, in accordance with the loading of spring 56 by adjusting screw 96.

As long as the pressure of the combustion gases in chamber 22 exceeds the impact pressure of the air at the air inlet to chamber 22, valves 172 are closed, but as soon as the pressure in chamber 22 falls below said impact pressure by reason of the discharge of combustion gases through the tail pipe (not shown), valves 172 open and admit a fresh charge of combustion air, whereupon a new explosion occurs in chamber 22, closing valves 172 and discharging another impulse of combustion gases through the tail pipe. The pressure in chamber 22 is therefore not constant but intermittent. However, since the explosions in chamber 22 occur at the rate of about 40 per second, the propulsion thrust of the discharged combustion gases is substantially constant.

As the aircraft gains altitude, the density of the atmospheric air decreases so that a proportionately smaller rate of fuel flow is required to maintain the desired fuel/air mixture ratio. This decreased fuel flow is effected by the expansion of bellows 60 which exerts a closing action on fuel pressure regulating valve 54, thus reducing the fuel pressure and resulting flow, as required. In order to limit the maximum rate of combustion in chamber 22 so as to not exceed the metallurgical and structural limitations of the engine, the maximum rate of fuel flow is limited by valve 154 which is adapted to open whenever the fuel pressure in cylinder 102 exceeds the setting of spring 156; this reduces the air pressure differential in chambers 136 and 138 which reduces the upward thrust of diaphragm 134 and the opening of valve 100.

When it is desired to stop the engine, latch 46 is withdrawn by pulling out knob 52 which permits spring 26 to close fuel inlet valve 24 and shuts off all fuel flow to the engine.

The terms and expressions used herein are employed as terms of description and not of limitation, and I have no intention, in the use of such terms and expressions, of excluding any equivalent structure or any parts thereof, but recognize that many modifications are possible within the scope of the appended claims.

I hereby claim as my invention:

1. Apparatus for controlling the supply of fuel to an internal combustion engine, comprising a conduit for fuel flowing to said engine, a metering orifice of variable area in said conduit, first means responsive to the velocity of flow of combustion air to said engine for varying the area of said orifice, and second means responsive to the atmospheric pressure adjacent said engine for regulating the fuel pressure differential across said orifice independently of said first means.

2. Apparatus as set forth in claim 1, in which said fuel pressure differential regulating means comprises a valve for controlling the flow of fuel thru said conduit, a bellows responsive to atmospheric pressure operatively connected to said valve and effective upon an increase in atmospheric pressure to move said valve in an opening direction, and a diaphragm subject to said fuel pressure differential operatively connected to said valve and effective upon an increase in said pressure differential to move said valve in a closing direction.

3. Apparatus as set forth in claim 1, in which said metering orifice comprises a piston movable in a cylinder to cover a varying portion of a port in a wall of said cylinder, and said first means comprises a diaphragm subject to a pressure differential indicative of the velocity of flow of combustion air thru said engine and operatively connected to said piston so as to move the latter in a port opening direction upon an increase in said air flow measuring pressure differential, and a spring acting on said piston in opposition to said diaphragm.

4. Apparatus as set forth in claim 3, including stop means for limiting the port opening movement of said piston.

5. Apparatus as set forth in claim 4, including means for positioning said stop means to make it effective or ineffective.

6. Apparatus as set forth in claim 5, including means for starting said engine, means responsive to the operation of said starting means for moving said stop positioning means into position to make said stop means effective during starting of said engine.

7. Apparatus as set forth in claim 1, including means for starting said engine, and means responsive to the operation of said starting means for limiting the opening of said orifice under engine starting conditions.

8. Apparatus as set forth in claim 7, including an inlet valve for controlling the admission of fuel to said conduit, and means responsive to the operation of said starting means for simultaneously opening said inlet valve and operating said orifice area limiting means.

9. Apparatus as set forth in claim 8, including means for supplying compressed air to the engine for starting purposes, and in which said starting control means responds to the pressure of the air supplied by said air supplying means.

10. Apparatus as set forth in claim 1, including an inlet valve for controlling the admission of fuel to said conduit, means biasing said inlet valve to closed position, means for starting said engine and means responsive to the operation of said starting means for opening said valve against said biasing means, and latch means for holding said valve open.

11. Apparatus as set forth in claim 1, including limiting means for establishing a selected maximum rate of fuel flow to said engine.

12. Apparatus as set forth in claim 1, including means responsive to the rate of flow of fuel to said engine and effective when said fuel flow rate exceeds a selected maximum value to limit the opening of said orifice.

JOHN M. BARR.

References Cited in the file of this patent

UNITED STATES PATENTS

| Number | Name | Date |
|---|---|---|
| 2,223,381 | Mock | Dec. 3, 1940 |
| 2,422,808 | Stokes | June 24, 1947 |
| 2,457,595 | Orr | Dec. 28, 1948 |
| 2,566,319 | Deacon | Sept. 4, 1951 |